United States Patent

[11] 3,540,675

[72] Inventor William Brandt Goldsworthy
Palos Verdes Estates, California
[21] Appl. No. 690,495
[22] Filed Dec. 14, 1967
[45] Patented Nov. 17, 1970
[73] Assignee Goldsworthy Engineering, Inc.
a corporation of Delaware

[54] FILAMENT DISPENSING MECHANISM
16 Claims, 4 Drawing Figs.

[52] U.S. Cl. .......... 242/156.2
[51] Int. Cl. .......... B65h 59/38
[50] Field of Search .......... 242/156, 156.1, 156.2, Inq

[56] References Cited

UNITED STATES PATENTS

| | | | |
|---|---|---|---|
| 1,528,755 | 3/1925 | Carter et al. | 242/156.2 |
| 2,417,252 | 3/1947 | Johnson | 242/156.2 |
| 2,419,808 | 4/1947 | Wirth | 242/156.2 |

*Primary Examiner*—Nathan L. Mintz
*Attorneys*—Robert J. Schaap and John D. Upham

ABSTRACT: A filament dispensing mechanism comprising a spool rotatably supported on a pivotally mounted cradle. The cradle is biased in one direction by means of a spring and in a second direction by the weight or acceleration of the filament spool. A belt is operatively trained around the spool and creates a braking action which will reduce as the weight of the spool or angular movement thereof is reduced. As the effective spool diameter is decreased, the moment arm about the axis of rotation of the spool is decreased and hence the braking action is decreased, thereby providing a controlled rate payout of filament.

INVENTOR
WILLIAM B. GOLDSWORTHY

BY
Robert J. Schaap

ATTORNEY

INVENTOR
WILLIAM B. GOLDSWORTHY
BY
Robert J. Schaap
ATTORNEY

FILAMENT DISPENSING MECHANISM

This invention relates in general to certain new and useful improvements in filament dispensing mechanisms, and more particularly, to a filament dispensing mechanism which is self-compensating for changes in the spool filament diameter and provides a controlled rate of feed.

The feeding of yarns, twines and similar types of filaments have often created a problem in cases where it is desirable, and even necessary, to pay the filament from the spool at a controlled rate of speed, even as the spool diameter changes. Generally, there is a tendency for the filament to unwind from the spool at an increasingly faster rate as the effective diameter of the spool decreases due to the unwinding thereof.

There have been many available devices for compensating for the filament feed acceleration as the diameter of the spool changes. Such devices include belts which are operatively trained around some braking mechanism on the spool. Other devices include spring-biased pins which bear against the spool frame or which engage the spool reel in some manner. However, each of these devices is ineffective for maintaining a constant linear feed payout within very critical limits. There is no commercially available device which will provide a constant and controlled rate of payout of filament within very critical limitations.

This problem of controlled rate of filament payout has become of critical importance in recent years with the introduction of filament winding machines. Generally, the spool of filament may be mounted in a cantilever type of position where the weight of the filament spool changes as the filament is unwound therefrom. This has a tendency to change the rate of filament payout. In addition, the filament spools are often rotated with the filament feeding arms in many of the commercially available winding machines and this acceleration on the filament spool also has a tendency to affect the rate of filament payout. As the acceleration of the winding machine changes, the rate of payout has a tendency to change. As a result thereof, it is difficult and oftentimes impossible to maintain uniform tension throughout the payout life of the spool.

It is, therefore, the primary object of the present invention to provide a filament feeding mechanism which automatically compensates for tension change on the filament as the diameter of the filament supporting spool is decreased.

It is another object of the present invention to provide a filament feeding mechanism of the type stated which is capable of providing a constant rate of filament payout within prescribed limits and without change as the diameter of the filament spool decreases during the unwinding process.

It is an additional object of the present invention to provide a filament feeding mechanism of the type stated which is highly efficient in its operation, and relatively inexpensive to manufacture.

It is also an object of the present invention to provide a filament feeding mechanism of the type stated which has a wide degree of versatility and is capable of being adjusted to accommodate different types of filaments and different sizes of spools.

It is another salient object of the present invention to provide a filament feeding mechanism of the type stated which creates a constant tension across the filament for the payout life of the filament spool.

With the above and other objects in view, my invention resides in the novel features of form, construction, arrangement and combination of parts presently described and pointed out.

GENERAL DESCRIPTION

Figure 1:
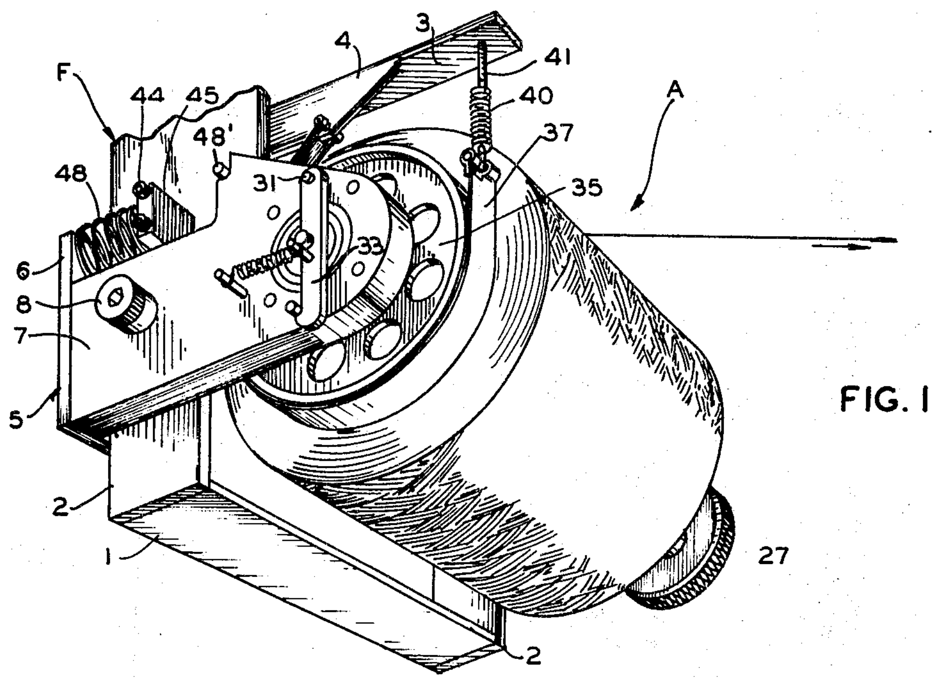
FIG. 1 is a perspective view of a filament feeding mechanism constructed in accordance with and embodying the present invention.

The present invention relates in general to a filament feeding mechanism which is adapted to feed filaments such as fiberglass at a prescribed substantially constant velocity and at a constant tension on the filament. The filament feeding apparatus comprises a supporting base which has a pair of upstanding end walls. Pivotally mounted on the end walls for movement about its central axis is a spool-cradle which carries thereon a rotatable shaft, the latter being adapted to accommodate a removable filament spool. Generally, the filament is wound on the spool and marketed as a prepackage unit. The spool-supporting shaft-forming element of the apparatus is removable for concentric insertion into the filament spool.

A brake drum is operatively mounted on the spool shaft and is rotatable therewith. A braking belt is trained about the brake drum and is operatively attached to the supporting frame for creating a braking effect on the rotational movement of the shaft and the filament spool. The cradle which is pivotally mounted on the supporting frame is normally biased in a first direction by a spring so that the tension on the braking belt is released, thereby reducing the braking effect.

The cradle and the filament spool carried thereon are mounted in a form of cantilever position so that the weight of the filament spool creates a second force which biases the cradle in a second direction against the action of the spring. This type of action generally tends to increase the braking effect on the rotational movement of the shaft in the filament spool. In essence, since the filament spool and the cradle is pivotally mounted, the weight of the spool is balanced by the action of the compression spring. This type of system will maintain a uniform tension on the device throughout the payout life of the filament spool. As the filament is unwound from the spool, the effective diameter thereof decreases and the weight of the spool will decrease. The action of the spring will bias the cradle in the first direction so that the braking action created by the braking belt and brakedrum is reduced. Therefore, it can be seen that the filament will be paid out from the spool at a controlled rate proportional to the demand tension thereon.

Since the system is not a friction free system, and since the spool has some definite and appreciable weight, a nonrotational force or "drag" is created which tends to prevent unwinding of the filament from the spool. The tension maintained on the filament during unwinding thereof is, in essence, a force couple which is the result of the force on the end of the filament combined with the moment arm with respect to the axis of rotation of the spool. Accordingly, it can be seen that the full weight of a new spool of filament will create a downward force causing the brake belt to bear against the brakedrum and thereby creating a braking action on the spool shaft and hence upon the spool. However, as the effective diameter of the spool decreases, due to the unwinding of the filament, the moment arm created by the displacement of the filament end with respect to the axis of rotation of the spool is substantially reduced. This reduction in force will enable the spring to urge the cradle in the first direction, thereby reducing braking action on the spool drum. Accordingly, as the spool diameter is decreased due to the unwinding thereof, the moment arm through which the filament is pulled is also reduced and hence a greater tension would result on the filament end. However, since the braking action is reduced, this provides a compensating reduction in force. As the filament continues to unwind from the spool, the moment arm will continually decrease and hence will, in turn, decrease the braking action on the spool shaft thereby providing compensation for the "drag" change on the spool and maintaining constant tension on the filament.

DETAILED DESCRIPTION

Referring now in more detail and by reference characters to the drawings which illustrate a preferred embodiment of the present invention, FIG. 1 designates a filament feeding apparatus which is generally mounted on a supporting frame F having a base plate 1 and a pair of transversely opposed outwardly extending support brackets 2. The filament feeding mechanism is more specifically designed for employment in the filament winding machine described in my copending U.S. Pat. application, Ser. No. 709,676, filed March 1, 1968 and which relates to an apparatus for filament winding about the axes of a mandrel. In like manner, the frame F forms part of the superstructure in the apparatus described in my copending application.

Figure 2:
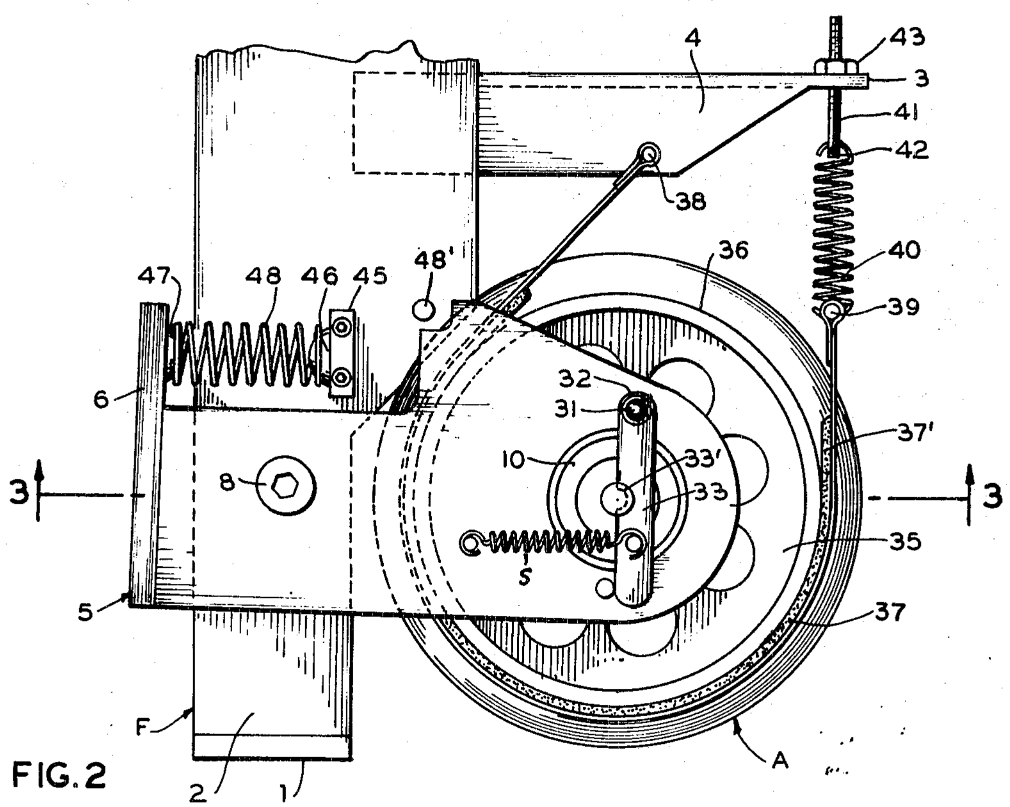
FIG. 2 is a side elevation view of the apparatus of FIG. 1.

The supporting frame F also includes an outwardly struck mounting bracket 3 having an angularly struck flange 4 in the manner as illustrated in FIGS. 1 and 2. For purposes of describing the filament dispensing mechanism of the present invention, the mechanism is mounted in a cantilever position so that the spool portion forming a part thereof creates a bending moment force and drag impeding the action of rotation.

Figure 3:
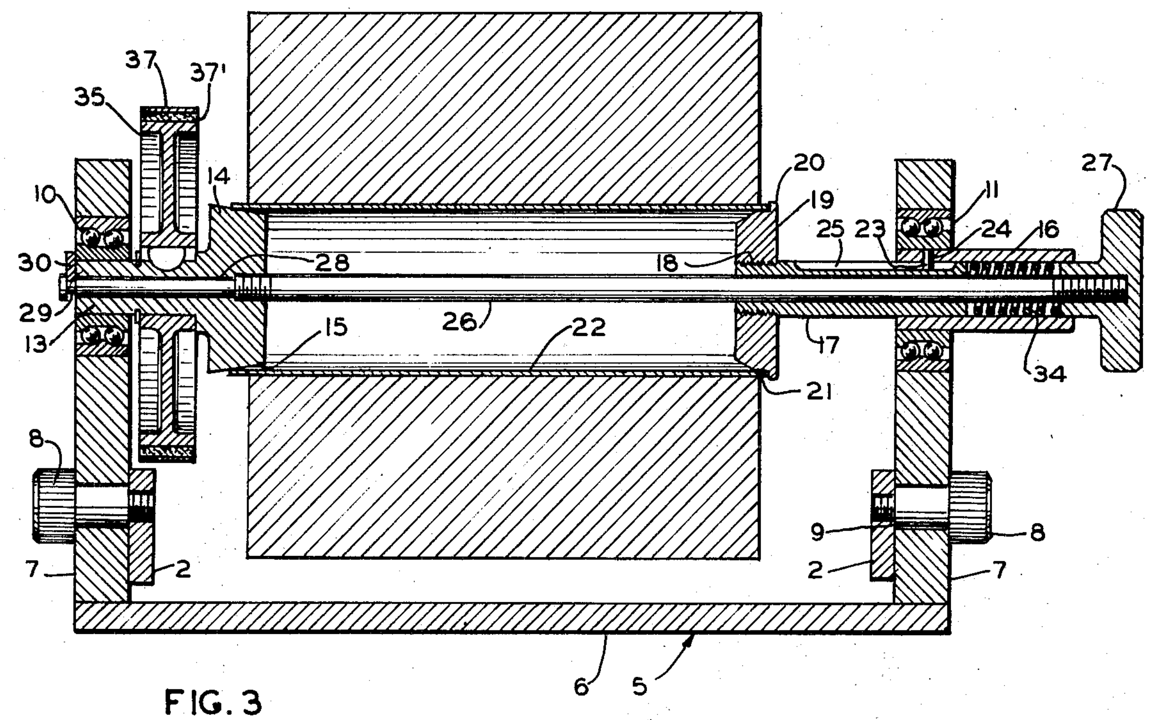
FIG. 3 is a vertical sectional view taken along line 3–3 of FIG. 2.

The filament dispensing mechanism generally includes a cradle 5 which is formed of a base plate 6 having a pair of transversely extending end walls 7 in the manner as illustrated in FIGS. 1 and 3. The end walls 7 are pivotally mounted on the bracket 2 by means of shoulder bolts 8 which extend through the end walls 7 and are threadedly secured in the brackets 2. The shoulder bolts 8 are conventionally provided with annular shoulders 9 which bear against the exterior surface of the upstanding brackets 2 and thereby provide a tiltable movement between the upstanding brackets 2 and the cradle 5. The outer end of the end walls 7 are apertured to accommodate conventional ball bearings 10, 11.

Journaled in the left ball bearing 10, reference being made to FIG. 3, is a stub shaft 13 which forms part of a tapered reel hub 14, the latter having a tapered annular side wall 15. Similarly journaled in the right ball bearing 11 for rotatable movement is a hollow guide sleeve 16. Concentrically disposed within and being axially shiftable in the guide sleeve 16 is an extendable quill sleeve 17, the latter having a threaded outer end 18. Threadedly secured to the outer end 18 of the quill sleeve 17 is a right reel hub 19 having an integrally formed outwardly flaring annular flange 20 and a relatively flat annular sidewall 21. By further reference to FIG. 3, it can be seen that the sidewall 21 is sized to accommodate the open end of a circular conventional tube 22 having a spool of filament wound thereon. It can be seen that the tapered reel hub 14 is sized so that a portion of the hub extends into the spool tube 22 and snugly engages the annular margin of the tube 22 in the manner as illustrated in FIG. 3. The quill sleeve 17 is rotatable with the guide sleeve 16 through a key 23 which fits within an annular slot 24 formed in the guide sleeve 16 and which is accommodated in an axial slot or so-called "-keyway" 25 formed in the quill sleeve 17. Thus, it is possible for the quill sleeve 17 to shift axially with respect to the guide sleeve 16, but is, nevertheless rotatable with the guide sleeve 16.

The quill sleeve 17 and the stub shaft 13 are centrally bore to accommodate a spindle or so-called "spool shaft" 26 which is threaded into the hub 14. The right-hand end of the spindle 26 is diametrally reduced and externally threaded for accommodating a knurled nut 27. The left-hand end of the spindle 26 is externally threaded for threaded securement into the reel hub 14. The spindle 26 is similarly provided with a diametrally reduced extended portion 28. The extended portion 28 terminates in an integrally formed diametrally reduced neck 29 which extends outwardly of the bearing 10. Integrally formed with the reduced neck 29 is an enlarged head 30, for reasons which will presently more fully appear.

Pivotally mounted on the outer face of the left end wall 7 by means of a pivot pin 31, the latter being retained by means of washers and locking nuts 32, is a retaining link 33 which has a semicircular slot 33' formed therein for engaging the neck 29 of the spindle 26. By reference to FIG. 2, it can be seen that when the semicircular slot 33' is engageable with the neck 29, the flat vertical faces of the retaining link 33 engages the head 30 and the outer end of the stub shaft 13, thereby retaining the spindle 26 in its axial position. The link 33 is biased into engagement with the shaft 13 by means of a spring S. Interposed between the end wall of the quill sleeve 17 and the end wall of the knurled nut 27 is a compression spring 34 which biases the quill sleeve 17 inwardly. Thus, by tightening the knurled nut 27, it is possible to create more compression of the spring 34 and thereby urge the quill sleeve 17 inwardly with a greater or lesser degree of force, as desired.

Thus, when it is desired to place a new spool on the spindle 26, the knurled nut 27 is engaged and turned so that the threaded portion of the spindle 26 is unthreaded from the hub 14. The spindle 26 can then be shifted to the right permitting the removal of the compression spring 34. Furthermore, the retaining link 33 is pivoted upwardly thereby permitting the spindle 26 to be withdrawn from the reel hub 14 and the stub shaft 13. This will also enable the quill sleeve 17 to be shifted to the right, reference being made to FIG. 3 and also to carry therewith the reel hub 19. Since the shaft 26 has been shifted axially to the right, the empty spool tube 22 can be removed for replacement of a new spool. The new spool tube 22 is then inserted on the tapered annular side wall 15 of the reel hub 14. The spool shaft 26 is next inserted into the bore of the tube 22 and the reel hub 19 and quill sleeve 17 are axially shifted to engage the right transverse end of the spool tube 22. Thereafter, the compression spring 34 is inserted into the bore of the guide sleeve 16 and the locking nut 27 is turned so the threaded end of the shaft 26 is threadedly secured to the reel hub 14. This type of construction provides for easy interchangeability of spools of filament.

Figure 4:
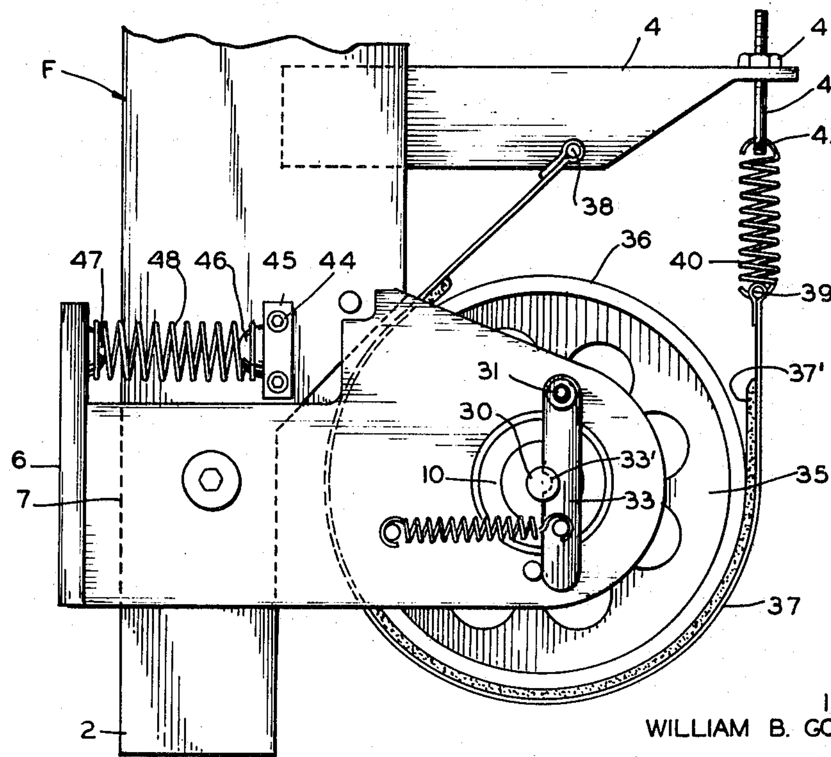
FIG. 4 is a side elevational view of the apparatus of FIG. 1, similar to FIG. 2, but with an empty filament spool thereon.

Keyed to the exterior surface of the stub shaft 13 and being rotatable therewith is a circular brakedrum 35 which is provided with an annular braking surface 36, the latter being formed of stainless steel, or asbestos, or any material normally employed in brake drums. A brake belt 37 is terminally looped at one end and is secured to a dowel 38, the latter in turn extending outwardly from the flange 4 of the upstanding bracket 3. The opposite end of the brake belt 37 is also terminally looped and secured to a pin 39 which forms part of a tension spring 40. The opposite end of the tension spring 40 is secured to a bolt 41 having a dowel 42 for engaging the tension spring 40 in the manner as illustrated in FIGS. 2 and 4. The bolt 41 extends through an aperture formed in the upstanding bracket 3 and is retained thereon by means of a hexagonal jam nut 43. The bolt 41 is threaded for most of its axial length and thus, it is possible to adjust the tension on the brake belt 37 by merely turning the hexagonal jam nut 43 and urging a greater portion of the shank of the bolt 41 through the aperture in the bracket 3. The underside of the brake belt 37 is provided with a suitable brake medium 37' such as asbestos or the like and which bears against the exterior surface of the braking surface 36.

Secured to the pair of transversely opposed support brackets 2 by means of sheet metal screws 44 is an outwardly extending retaining block 45 having a downwardly presented boss 46 on its underside. Similarly mounted on the base plate 6 of the cradle 5 is an aligned boss 47 and mounted on each of the cooperating bosses 46, 47 is a compression spring 48 which biases the entire cradle 5 in a counterclockwise direction, reference being made to FIGS. 2 and 4. Thus, it can be seen that the cradle 5 and the entire spool assembly mounted thereon is pivoted in such a direction so as to release the brake belt 37 from engagement with the brakedrum 35, by reducing the tension on the belt 37. It can be seen by reference to FIG. 2 that the boss 47 provides a limit of movement of the cradle 5 in the clockwise direction by engaging the frame F, and that an outwardly struck pin 48' on the frame provides a limit of movement of the cradle 5 in the counterclockwise direction when in engagement with the cradle 5.

In essence, the spring 48 balances the weight of the filament spool about the axis of pivotal movement of the cradle 5 which extends through the axial centerline of the shoulder bolts 8. It can be seen by reference to FIG. 1 that the weight of the spool creates a force which tends to pivot the cradle in a clockwise direction opposing the force of the compression spring 48 which biases the cradle in a counterclockwise direction.

Furthermore, it can be seen that as the effective diameter of the spool changes, the demand tension on the end of the filament also changes.

As the filament continues to unwind from the spool, the effective diameter of the spool decreases and also the weight of the spool decreases. The decrease of weight of the spool is offset by the action of the compression spring 48 which tends to release the braking action upon the spool. In addition, since the effective diameter of the spool has changed, the tension on the end of the filament, which is determined by the pull multiplied by the moment arm through which the filament is pulled, is also substantially reduced. It can be seen that the moment arm is the distance from the axis of rotation of the spool tube 22 to the outer diameter of the filament wound thereon. This would tend to increase the tension on the end of the filament. However, since the braking action is also proportionally reduced through the action of the compression spring 48, the tension maintained on the end of the filament is substantially the same, even as the spool diameter decreases. Accordingly, it is possible to maintain constant tension on the end of the filament as it is unwound from the spool. Furthermore, this type of balancing of forces creates a controlled rate of filament payout even if the effective spool diameter is continually decreasing. It can be seen that a constant payout speed is achieved due to the fact that the withdrawal force on the filament is rendered constant.

In connection with the present invention, it should also be observed that the forces which act upon the spool and tend to create tension changes on the pull of the filament can be created from various means. For example, the tension change on the filament could occur through an angular acceleration of the entire spool mechanism, such as in the manner described in my copending U.S. Pat. application Ser. No. 709,676, filed March 1, 1968. In this case, the filament dispensing mechanism is mounted in its upright position. However, since the device upon which the filament dispensing mechanism is mounted is continually rotating, the forces acting upon the spool will also vary and have a tendency to change the tension upon the end of the filament. This is continually offset by the action of the compression spring 48 in conjunction with the braking mechanism described.

It should also be observed that the brake drum and the braking mechanism described herein could be replaced with a viscous shear brake, if desired. In addition, a hydraulic cylinder with a pressure control to vary the load of the cylinder could be substituted for the compression spring 48. It is also possible to substitute a hysteresis clutch or a magnetic particle clutch for the braking system described herein.

OPERATION

When it is desired to insert a new spool of filament on the spindle 26, the knurled nut 27 is turned so that the threaded portion of the spindle 26 is unthreaded from the hub 14. This enables the spindle 26 to be shifted outwardly permitting the withdrawal of the compression spring 35 and the retraction of the quill sleeve 17 in the guide sleeve 16 within the limits permitted by the key 23. As this occurs, the spool tube 22 is disengaged from the reel hub 14 permitting withdrawal of the tube 22 therefrom. The entire spool shaft 26 can be removed by releasing the link 33 from engagement with the neck 29. This is accomplished by pivoting the link 33 upwardly and withdrawing the shaft 26. After the spool tube 22 had been removed, a new spool tube 22 is inserted thereon. Thereafter, the shaft is extended forwardly so that the forward end thereof extends outwardly and is locked in place with the retaining link 33. After the compression spring 35 is inserted the knurled nut 27 is locked in place. The nut 27 is turned to thread the spindle 26 into the hub 14 and this action forces the hub 19 into tight engagement with the tube, as illustrated in FIG. 3.

The filament is connected to a mechanism (not shown) for maintaining a constant rate of withdrawal of filament from the spool. As the filament is unwound from the spool, the effective diameter thereof is continually decreased in proportion to the amount of filament withdrawn. Generally, the speed of the filament during the withdrawal process is constant and hence it is desired to maintain a constant force balance on the spool to maintain this desired rate of payout. A second effect resulting from the operation is that it is possible to maintain a constant tension on the filament, regardless of the withdrawal rate. As the effective diameter of the spool is decreased due to the unwinding thereof, the fixed drag on the spindle will increase in proportion to the reduction of the effective diameter of the spool. However, due to the fact that the overall weight of the spool has been lessened, the spring 48 will create a reduction in the braking force on the spool in the manner as previously described. This reduction in braking force is directly proportional to the change in tension on the filament as a result of the shorter moment arm. Accordingly, it can be seen that a constant tension is maintained on the filament through the entire payout life of the spool. Moreover, if a constant payout speed is the desired effect then it can be seen that if a constant payout force is applied to the filament, the payout rate of the filament will be substantially linear despite changes in package geometry. Accordingly, the same rate of filament delivery is maintained regardless of the effective diameter of the spool.

The apparatus of the present invention finds particularly effective use in filament winding apparatus of the type described in the aforementioned copending application. In apparatus of this type, the filament must be prestrained or under a preselected amount of tension. Furthermore, it is often undesirable to have the tension vary by even one-half of a pound. The apparatus of the present invention has been found to be effective in delivering the filament at the controlled and constant tension regardless of other forces acting upon the spool of filament.

It should be understood that changes and modifications can be made in the form, construction, arrangement and combination of parts presently described and pointed out without departing from the nature and principle of my invention.

I claim:

1. An apparatus for providing a controlled rate of filament payout from a filament spool at a demand tension, said apparatus comprising base means, a cradle pivotally mounted on said base means about a pivot point, a spool rotatably mounted on said cradle, said cradle being mounted in such manner that a first force is created on said spool causing a rotational drag thereon and biasing said spool in a first direction about said pivot point, braking means operatively associated with said spool tending to impede rotation thereof, and means creating a second force biasing said cradle in a second direction about said pivot point, braking means operatively associated with said spool tending to impede rotation thereof, and means creating a second force biasing said cradle in a second direction about said pivot point tending to reduce the braking effect on the rotation of said spool, the terminal end of said filament being concentrically located to the axis of rotation of said spool.

2. The apparatus of claim 1 further characterized in that a brakedrum is operatively associated with said spool and is rotated therewith, and said braking means is operatively associated with said brakedrum.

3. The apparatus of claim 1 further characterized in that a brake drum is operatively associated with said spool and is rotated therewith, and said braking means comprises a belt which is trained about said drum and is operatively secured to said base means.

4. The apparatus of claim 3 further characterized in that a spring is operatively interposed in said belt.

5. The apparatus of claim 1 further characterized in that said means creating a second force is a compression spring.

6. The apparatus of claim 5 further characterized in that limit means is operatively associated with said base means for limiting the movement of said cradle in one direction.

7. The apparatus of claim 5 further characterized in that said spring is operatively interposed between said base means and said cradle.

8. The apparatus of claim 1 further characterized in that said apparatus provides a constant velocity delivery of a filament, said apparatus comprising a spindle operatively mounted on said base means, said spool being capable of being operatively disposed on said spindle and of being rotatable with respect to said base means, means for creating and adjusting tension on said spindle for impeding rotation thereof, and means on said base means for removably holding said spindle on said base means and for enabling periodic removal of said spindle from said base means.

9. The apparatus of claim 8 further characterized in that braking means is operatively associated with said spindle impeding rotation thereof.

10. The apparatus of claim 8 further characterized in that a brakedrum is operatively associated with said spool and is rotated therewith, and said braking means is operatively associated with said brakedrum.

11. An apparatus for supplying a strand of material responsive to the demand thereon, said apparatus comprising base means, a cradle pivotally mounted on said base means about a pivot point, a spool rotatably mounted on said cradle, said cradle being mounted in such manner that a first force is created on said spool causing a rotational drag thereon and biasing said spool in a first direction about said pivot point, braking means operatively associated with said spool tending to impede rotation thereof, and means creating a second force biasing said cradle in a second direction about said pivot point tending to reduce the braking effect on said spool, the terminal end of said strand of material being concentrically located with respect to the axis of rotation of said spool.

12. An apparatus for supplying a strand of material responsive to demand thereon, said apparatus comprising base means, a support element located on said base means for pivotal movement about a pivot point, a spool rotatably carried by said support element, said support element being mounted in such manner that when a first force is imposed on said spool, said spool is biased in a first direction about said pivot point, braking means operatively associated with said spool tending to impede rotation thereof when said spool is biased in said first direction, and means creating a second force biasing said support element in a second direction about said pivot point tending to reduce the braking effect on said spool to thereby supply said strand of material at a relatively constant tension.

13. The method of supplying a strand of material from a spool of such material responsive to the demand thereon and at a relatively uniform tension, said method comprising maintaining an operative braking force on said spool tending to reduce rotation of said spool and which braking force has a force vector in a first direction tending to pivot said spool in said first direction about a pivot point, creating a second force on said spool tending to bias said spool and pivot said spool in a second direction about said pivot point to thereby increase said braking action and rotational drag on said spool, creating a third force tending to bias said spool in said first direction to thereby reduce said braking action, and reducing the braking action on said spool in proportion to the diameter of said spool and continuously balancing said first, second, and third forces to maintain a constant tension on said material as it is paid out from said spool.

14. The method of claim 13 further characterized in that the second force maintained on said strand of material is substantially a constant force.

15. The method of claim 13 wherein the second force is a function of the weight of the spool and the diameter thereof.

16. The method of claim 13 wherein the second force is caused by a force tending to unwind the strand from the spool and the moment arm from the center of the spool to the peripheral annular surface thereof.